US006918409B1

(12) United States Patent
Parker

(10) Patent No.: US 6,918,409 B1
(45) Date of Patent: Jul. 19, 2005

(54) SPOOL AND POPPET INLET METERING VALVE

(75) Inventor: David Glen Parker, Shelby, NC (US)

(73) Assignee: Honeywell International Inc., Morristown, NY (US)

( * ) Notice: Subject to any disclaimer, the term of this patent is extended or adjusted under 35 U.S.C. 154(b) by 37 days.

(21) Appl. No.: 10/318,378

(22) Filed: Dec. 13, 2002

Related U.S. Application Data
(60) Provisional application No. 60/339,094, filed on Dec. 13, 2001.

(51) Int. Cl.[7] ............................................. F16K 31/02
(52) U.S. Cl. .............................. 137/614.11; 251/129.07; 251/325; 335/273
(58) Field of Search ....................... 251/129.07, 129.15, 251/129.02, 325, 282, 64, 121; 137/614.11; 337/273; 335/273

(56) References Cited

U.S. PATENT DOCUMENTS

| | | | | |
|---|---|---|---|---|
| 2,751,923 A | * | 6/1956 | Towler et al. ............... | 251/325 |
| 4,157,168 A | * | 6/1979 | Schlagmuller et al. . | 251/129.02 |
| 4,638,974 A | * | 1/1987 | Zeuner et al. .......... | 251/129.15 |
| 4,852,853 A | * | 8/1989 | Toshio et al. ........... | 251/129.07 |
| 4,906,880 A | * | 3/1990 | Miura ..................... | 251/129.15 |
| 5,156,184 A | * | 10/1992 | Kolchinsky ............. | 137/625.65 |
| 5,205,531 A | * | 4/1993 | Kolchinsky ............. | 251/129.15 |
| 5,261,637 A | * | 11/1993 | Curnow .................. | 251/129.15 |
| 5,439,030 A | * | 8/1995 | Cazcarra Pallaruelo | 137/614.11 |
| 5,497,806 A | * | 3/1996 | Swank et al. ........... | 137/625.65 |
| 5,918,635 A | * | 7/1999 | Wang et al. ............ | 137/625.65 |
| 5,964,248 A | * | 10/1999 | Enarson et al. ........ | 137/625.37 |
| 6,092,784 A | * | 7/2000 | Kalfsbeck ............... | 251/129.15 |
| 6,827,330 B2 | * | 12/2004 | Holst et al. ................. | 251/325 |

* cited by examiner

*Primary Examiner*—John Bastianelli
(74) *Attorney, Agent, or Firm*—Kris Fredrick

(57) ABSTRACT

Valve structures include a combination of spool valving and poppet valving. A spool function of the structure regulates the flow of a liquid, such as the flow of fuel to a diesel engine. A poppet function provides a low leakage in the valve in a closed or cut-off state. With this combination in a valve, spool clearance can be increased reducing the cost and precision machining/assembly of the components, because the poppet to seat closure provides the sealing function at cut-off. Included are an air-gap flux adjustment to adjust responsiveness to control current, and a force pre-load adjustment.

20 Claims, 6 Drawing Sheets

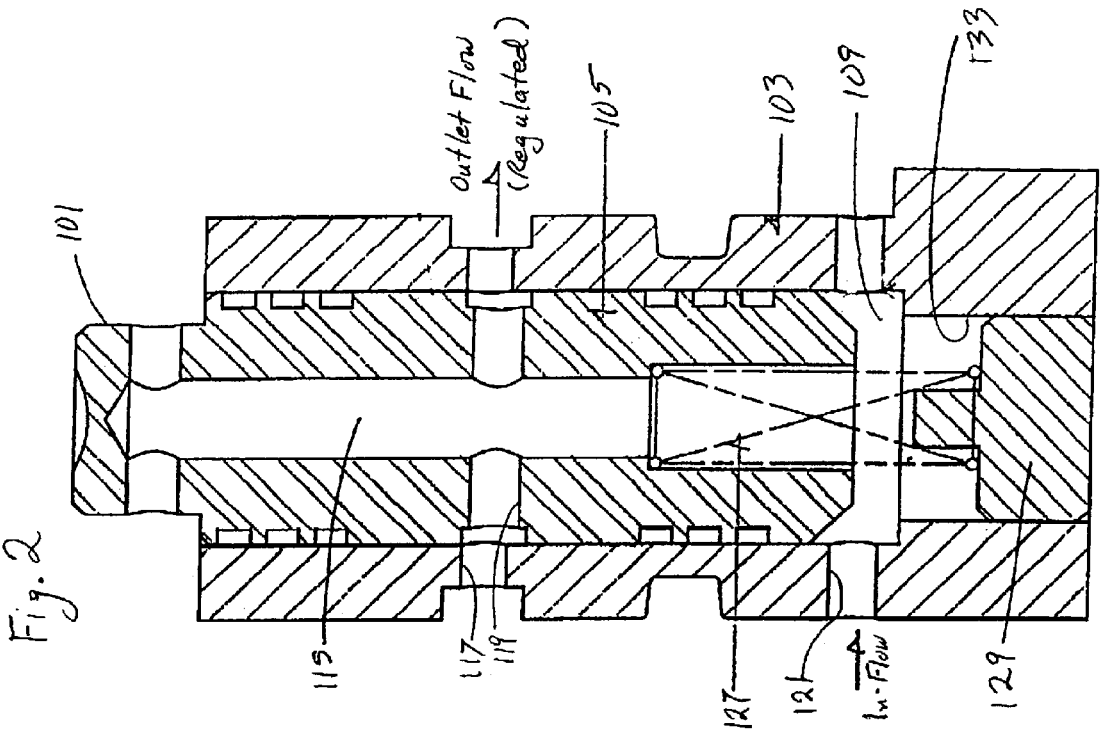
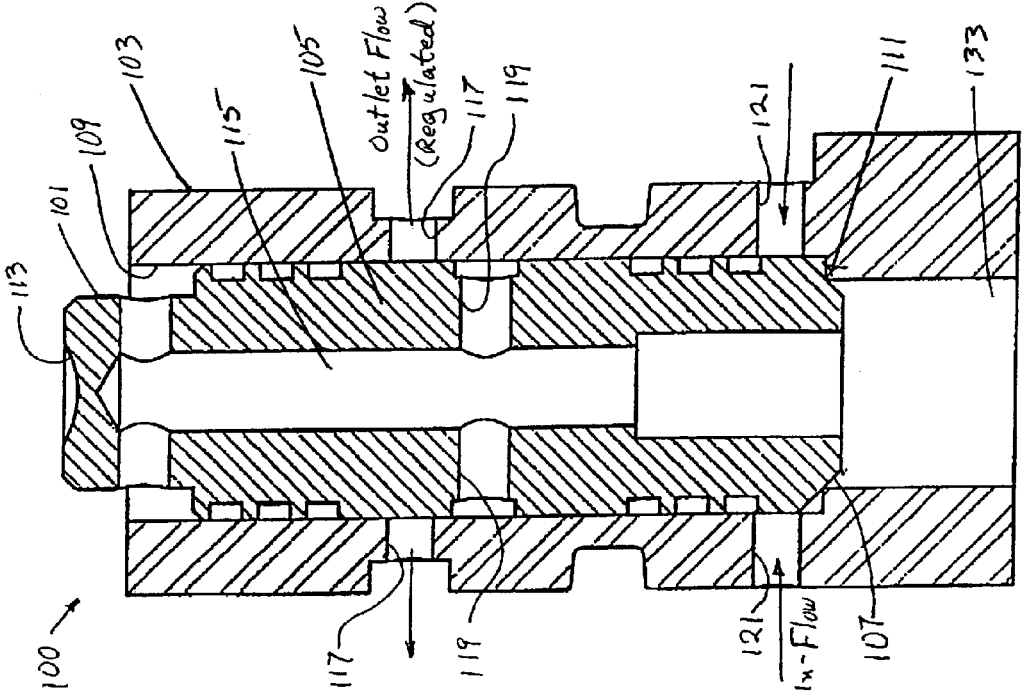

SPOOL AND POPPET INLET METERING VALVE

CROSS-REFERENCE TO PROVISIONAL APPLICATION

This application claims priority from U.S. Provisional Patent Application Ser. No. 60/339,094 filed Dec. 13, 2001, the entire disclosure of which is incorporated herein by reference.

TECHNICAL FIELD

The present subject matter relates to a valve structure, using a combination of a spool and a poppet, for metering inlet flow of a liquid, for example flow of fuel for a diesel engine.

BACKGROUND

There are a number of valve applications for metering the flow of a liquid that require a high degree of controllable flow regulation and require a complete cut-off with low leakage. However, valve structures that can meet one requirement often can not easily meet the other, particularly in a manner that is economically feasible for many common valve applications.

Consider fuel supply metering in the context of a diesel engine. Some diesel engine manufacturers provide a flow-metering valve in the fuel line, for example, in the inlet line going to the high pressure fuel pump. The valve regulates fuel flow to the pump, and the pump in turn provides fuel under pressure to an accumulator, and thence to fuel injectors coupled to the cylinders of the engine, for combustion. The flow regulation allows the diesel engine to run more efficiently, because it is not using horsepower to build pressure in the high pressure flow for what would otherwise be unused diesel fuel.

To perform the flow regulation, the metering valve must provide a fine degree of flow control and corresponding accurate responsiveness to a control signal. Poppet type valves do not provide the necessary regulation performance. A poppet valve has a moveable valve member with a face that engages a seat, when the moveable valve member reaches the closed position. Withdrawal of the poppet valve face away from the seat opens the valve. By nature, with a poppet design, a small degree increase in opening produces a large gain in the valve-opening area, and a corresponding large increase in flow. Hence, prior designs for fuel regulation valves in the inlet lines of diesel engines have used spool and sleeve designs.

Spool valve designs use a sleeve with lateral flow openings and a spool mounted for sliding axial movement within the sleeve. In a closed position, the sidewalls of the spool completely block the flow openings. As the spool moves along the sleeve axis, the movement opens access to the flow openings, for example, by withdrawing the spool past the flow openings or by aligning passages or notches in the spool with the flow openings through the sleeve. The positioning movement of the spool can be readily controlled by the current applied to a solenoid actuator Precise positioning of the spool within the sleeve provides a fine degree of control of the amount that the flow ports are opened and thus control of the amount of fluid flowing through the valve.

However, at times, it also is appropriate to control the metering valve in the diesel engine fuel supply application to completely cut-off the supply of fuel, for example, to starve the engine of fuel and thus cut-off combustion in the diesel engine. It is difficult to achieve a high degree of cut-off (low or no leakage) using spool valve designs. Because of the need for the spool to move within the sleeve, there must be some clearance between the outer surface(s) of the spool and the inner surface(s) of the sleeve. If the clearance is at all substantial, fluid tends to leak past the spool in the fully closed condition. Past efforts to minimize leakage at cut-off have relied on constructing spool valves, for fuel inlet metering, so that the tolerances between the spool and the sleeve are extremely tight (though not too tight since improper dimensioning causes friction and wear or even binding). Often, the assembly process has involved manually fitting individual spools and sleeves together and testing the tolerances and/or leakage. Such an approach makes manufacture of the metering valves extremely complex and expensive.

Also, it is often difficult to build a large number of such valves that satisfy strict performance standards, e.g. degree of opening (flow) at zero-current and/or response to a specified current. Minor differences in the dimensions of the valve elements and/or in the solenoid-based actuator could result in substantial variation from valve to valve in the finished products. It was also not practical to adjust or adapt a given valve design for use in different specific applications, for example, to provide different performance for different sized diesel engines.

Hence a need exists for an improved liquid flow metering valve for applications, such as inlet metering of fuel to a diesel engine, which require a high degree of controllable flow regulation as well as cut-off with low leakage. It is desirable that any such valve structure be easy and inexpensive to manufacture and yet provide minimal performance variation from valve-to-valve. If practical, the design should be readily adaptable to use in multiple applications requiring-different performance characteristics.

SUMMARY

The exemplary valves disclosed herein utilize a combination of spool valving and poppet valving. A spool function of the valve regulates the flow of a liquid, such as the flow of fuel to a diesel engine. A poppet function provides a low leakage through the valve, when it is in the closed or cut-off state. With this combination in a valve, spool clearance can be increased reducing the cost and precision machining/assembly of the components, because the poppet to seat closure provides the sealing function at cut-off.

The exemplary valves comprise a sleeve with a central bore. A moveable valve member is mounted for axial movement within the bore of the sleeve. The moveable valve member includes a spool, and an end face of the spool forms the poppet face. A seat is formed at an appropriate location along the bore of the sleeve. In the closed position, the poppet face engages the seat formed in the central bore of the valve sleeve, cutting off flow of fuel through the valve. This poppet valve closure provides little or no leakage at cut-off. When the valve is open, however, the axial position of the spool within the sleeve determines the degree of opening of the valve, for example the degree of opening of one or more liquid exit orifices through the valve sleeve. A solenoid actuator or the like controls the axial movement and positioning of the spool within the central bore of the sleeve. The solenoid actuation of the spool valve operation provides a high degree of controllable flow regulation, that is to say so that fine variations in control or drive current provide fine variations in spool position and correspondingly fine variations in the degree of opening of the spool valve.

The exemplary valves also use a secondary airgap adjustment, to improve accuracy and reduce valve to valve variation in responsiveness. Essentially, the position of a flux member in the airgap between the armature and the winding of the valve drive solenoid is adjusted, for example, in a test phase. Adjustment of the position of this member adjusts the flow of magnetic flux within the solenoid and thus adjusts its responsiveness to drive current. During assembly, each valve can be adjusted, to compensate for minor variations, so that each valve performs in substantially the same manner.

With the addition of a spring and an adjustment plug to the assembly, the valve assembly can also be calibrated for pre-load forces. In one example, the spool is held in a position in the valve body, before assembling the seat/spool assembly into the main valve housing. A force probe holds the spool in that location and the adjustment plug can then be threaded in, increasing the pre-load of the spring force on the spool until a set load is established. At that time, the plug will be locked in position and the assembly installed into the valve body. In the closed position, the angled poppet face engages a seat formed in the distal end of the central bore of the valve sleeve. Adjustment of the pre-load spring force also adjusts the degree of opening of the spool/poppet valve when no current is applied to the valve actuator solenoid.

Different settings for one or both adjustments can be used to define different performance characteristics. For example, different settings may be used to meet different manufacturer's specifications for metering valves in different engine fuel systems.

One example of the valve uses a pivoting pushpin that connects the armature of the solenoid to the spool. This setup reduces the risk of misalignment between the components but allows a mechanical connection that allows the magnetic force to be carried to the spool. An alternative example of the actuator system utilizes a bore in the armature face to receive a pin extending from the proximal end of the spool, to couple the armature to the spool. This coupling may use a threaded engagement, a pressure fit, or the like. Abutment of the distal face of the armature to the proximal face of the spool transfers forces between the armature and spool. Alternative direct couplings also may be used.

BRIEF DESCRIPTION OF THE DRAWINGS

The drawing figures depict one or more implementations in accord with the present concepts, by way of example only, not by way of limitations. In the figures, like reference numerals refer to the same or similar elements.

FIG. 1 is a cross-sectional view of the valve sub-assembly of a first example of the spool-poppet type metering valve.

FIG. 2 is another cross-sectional view of the valve sub-assembly of the first example of the valve, showing the addition of the spring and adjustment plug to the sub-assembly, for calibration of pre-load forces.

DETAILED DESCRIPTION

Figure 3:
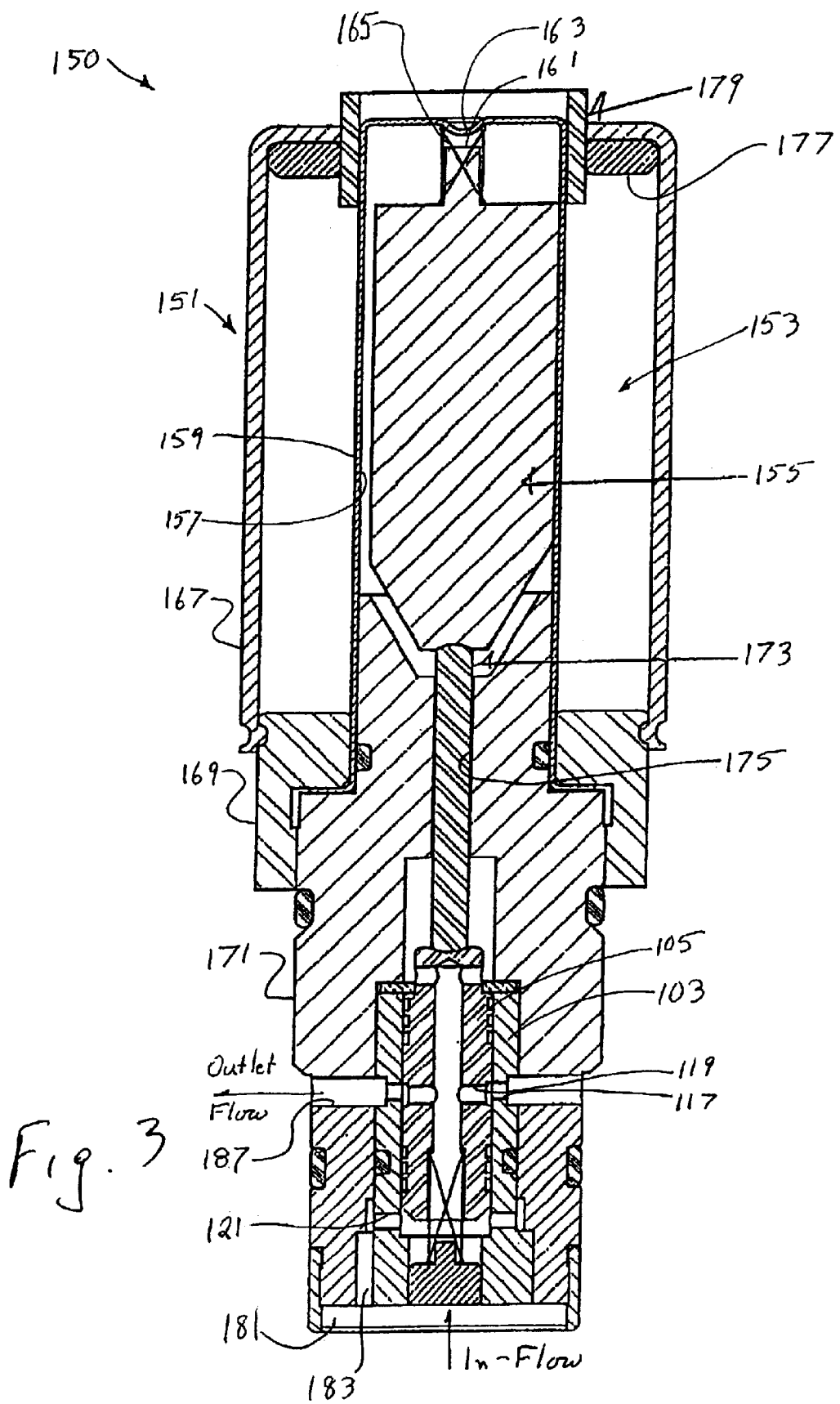
FIG. 3 is a cross-sectional view of the complete spool-poppet type metering valve system, of the first example.

The various structures disclosed herein relate to a valve system, including a valve sub-assembly and an actuator, for providing regulated or metered flow of a liquid, such as fuel. The valve structures utilize a combination of poppet valving for closure and spool valving for flow regulation. The exemplary valve systems also incorporate one or more adjustments, such as a magnetic flux adjustment for the solenoid of the actuator and a pre-load adjustment for the valve sub-assembly.

In an initial application, examples of the valve disclosed herein will be used to meter diesel fuel to the fuel pumps on diesel engines. The ideal in such a valve application is to regulate the fuel going to the pump to the amount currently required by the engine. Such valving of the fuel allows the diesel engine to run more efficiently, because it is not using horsepower to build pressure for unused diesel fuel (i.e. to pressurize fuel not yet required by the engine). For completeness of understanding, an example of such an application is described, later, with regard to FIG. 14.

Reference now is made in detail to the examples illustrated in the accompanying drawings and discussed below. FIGS. 1–12 illustrate examples of combination spool and poppet valves and actuators for such valves, used for metering the flow of a liquid, for example, as a fuel inlet metering valve.

FIG. 1 shows an enlarged cross-section of the valve sub-assembly 100, of a first example, in a partially assembled condition (prior to installation of the adjustment plug and spring—compare to FIG. 2). As shown in FIG. 1, the valve sub-assembly 100 comprises a moveable sliding valve member 101 and a valve body or sleeve 103. The sliding valve member 101 comprises a cylindrical spool 105 with an angled poppet face 107 at its distal end.

As shown, the sleeve 103 includes a main central bore 109, within which the spool 105 is located for sliding movement. The distal end of the main central bore 109 terminates in a circular, inwardly extending shoulder, which forms the poppet valve seat 111. From the seat to the end of the sleeve, the bore extends downward in the illustrated orientation; but the inner diameter in this region is smaller than the diameter of the spool 105. In the example, the shoulder forms a relatively sharp right-angle seat for engaging the slanted (45° angle) poppet valve face 107, although other poppet face and seat designs may be used. In the closed or cut-off state (e.g. as in FIG. 1), the distal face of the spool forming the angled poppet valve face 107 engages the valve seat 111.

The proximal end of the member 101 is cupped or dished at 113, to receive an engaging face of a pushpin, as discussed later. During assembly of the components as shown in FIG. 1, the spool/poppet is coined. Essentially, a force is applied to the sliding valve member 101 at the cup 113 in the proximal end, and this force is transmitted through the member 101 to the engagement of the face 107 with the seat 111. This coining somewhat molds the material of the face 111 to the poppet face 107, and thereby eliminates any imperfections/dimensional differences and effectively matches the poppet face 107 to the seat face 111. Other designs for the poppet face and seat, however, may not require such coining.

The spool 105 includes a central bore 115, for passage of fuel when the spool 105 is retracted to open the poppet valve, as shown in FIG. 2. Near its mid-section, the sleeve 103 has two lateral bores forming orifices 117 for allowing the regulated fuel flow to exit from the valve sub-assembly 100. The spool 105 also includes two lateral bores 119, which extend outward from the exterior surface of the cylindrical mid-section of the spool 105. When the poppet valve is open (FIG. 2), fuel under pressure passes outward from the central bore 115 through the lateral bores 119, when the bores 119 overlap or align with the outlet orifices 117.

The sleeve 101 also includes two inlet ports 121. Fuel is applied to the main central bore 109 through these inlet ports 121. In the closed or cut-off state (FIG. 1), the poppet seal between the engaged poppet face 107 and poppet valve seat 111 prevents flow of fuel into the main central bore 109. However, when the poppet valve is open (FIG. 2), fuel entering the valve sub-assembly 100 through the inlet flow ports 121 passes between the poppet face 107 and the seat 111 and flows into the central bore 109 of the sleeve 103. In turn, the fuel flows from the bore 109 and through the bore 115 of the spool 105 (upward in the exemplary orientation shown in FIG. 2). If the lateral bores 119 overlap or align with the orifices 117, fuel is allowed to flow out of the valve sub-assembly 100.

As the moveable valve member I 01 moves in response to a regulatory force, the axial position of the spool 105 changes. Such a change of the spool position changes the percentage alignment of the lateral spool bores 119 to the lateral fuel regulation orifices 117 on the sleeve 103. Such variation in alignment of the bores 119 to the orifices 117 regulates the percentage valve opening and thus regulates the outflow of fuel from the valve sub-assembly 100.

At the distal end, the internal fluid chambering is closed off by an end cap or plug. The end plug may be an element of or fastened to the outer valve housing. In this embodiment the end cap takes the form of an adjustment plug 129 inserted into the distal end of the sleeve 103.

FIG. 2 shows in cross-section the sleeve 103 and the spool 105, as well as the spring 127 and the adjustment plug 129. As shown, the spring 127 has pushed the spool 105 through the sleeve 103 to a substantially open position.

The spring 127 extends from an abutment against the interior face of the adjustment plug 129 to engage a shoulder 131 formed within the central bore 115 of the spool 105. The spring 127 is a compression spring. In this first example, the sleeve 103 includes a threaded bore 133, and the plug 129 is threaded so that it can be screwed into that bore 133. The number of turns on the plug 129 into the threaded bore 133 causes the plug 129 to move a predetermined distance into the threaded bore 133 and thereby compress the spring 127 by a precise amount. Of course, other means to adjust the position of the end plug relative to the sleeve and spool may be used in place of the threaded coupling.

Precise adjustment of the plug position serves to define a pre-load force applied by the spring 127 against the shoulder 131 within the spool 105. The force tends to push the spool 105 into and through the sleeve 103 and thereby open the poppet portion of the valve (compare FIG. 2 to FIG. 1). The spring force tends to resist closing of the poppet valve portion as well as closing of the spool valve portion.

FIG. 3 is a cross-sectional view of the entire valve system 150, including the valve elements discussed above together with the elements for actuating the valve. As shown, the actuator includes a solenoid 151 having a stator winding 153 and an armature 155. The armature 155 moves within the central bore 157 of the solenoid 150 formed by the inner housing or tube 159. Movement of the armature 155 within the bore 157 allows axial movement of the armature within the solenoid winding 153. The force applied to the armature 155 is proportional to an electrical signal applied to the winding 153.

The proximal end of the armature 155 includes a central, cylindrical extension 161, and the opposing face of the inner housing 159 has a protruding dimple 163 of similar diameter extending inward toward the armature 155. A compression spring 165, of slightly larger diameter, fits over the extension 161 and the dimple 163 and extends between the inner face of the inner housing 159 and the proximal end-face of the armature 155. The compression spring 165 exerts a force on the armature 155 tending to move the armature 155, the pushpin 173 and the spool 105 toward the closed position, in opposition to the force applied by the spring 127. The balance between the two spring forces establishes a spool position, for the state in which there is no control signal to actuate the solenoid.

An outer housing 167 encases the armature 153, and the housing 167 is secured to a collar or cap 169. The collar 169, in turn is attached to an outer valve housing 171. The outer valve housing 171 supports the valve sleeve 103 and through it the other elements of the valve sub-assembly, that is to say in the arrangement shown in FIG. 3.

The actuation system also includes the pushpin 173. The pushpin slides within a central bore 175 of the outer valve housing 171. A distal end face of the pushpin 171 engages the cupped proximal surface of the spool 103. The proximal end face of the pushpin 173 engages a cupped surface formed in the proximal face of the solenoid armature 155.

Movement of the armature 155 in response to the electrical current flow through the winding 153 moves the pushpin 173, which in turn pushes the spool 105, for example from the open position shown in FIG. 3 toward the poppet seat face 111 (compare to FIG. 1). Depending upon the amount of this movement, the spool 105 may reduce fuel flow outlet via the lateral bores 119 through the spool 105 and the outlet orifices 117 through the sleeve 103. However, this motion tends to compress the spring 127. The force of the solenoid may be sufficient to overcome the force of the spring 127 and push the spool 103 to the fully closed position where the poppet face 107 engages the poppet seat 111 (similar to that shown in FIG. 1), and completely cuts off flow of fuel through the valve system 150.

This exemplary valve system 150 also uses a secondary airgap adjustment to improve accuracy and reduce valve to valve variation in performance. Specifically, the valve system 150 includes a flux washer 177 and a flux adjustment sleeve 179 as shown in FIG. 3. In the example, the flux washer 177 and flux adjustment sleeve 179 are steel.

The adjustment sleeve 179 consists of a steel flux rig that is moved into the magnetic path of the solenoid as illustrated in the drawing, that is to say into a portion of the gap between the winding 153 and the armature 155 of the solenoid 151. The solenoid winding 153, when energized, produces magnetic flux lines in the magnetic circuit Increasing overlap of the flux ring 179 to the armature 155, that is to say by pressing the ring 179 further in, increases the amount of magnetic flux lines through the armature 155 the flux washer 177, the flux ring 179 and the housing 159 167. This is done by the addition of the steel in the magnetic circuit thus increasing the magnetic force of the solenoid 151 on the pushpin 173 (and thus on the member 101), in response to a given amount of current through the winding 153 of the solenoid 151.

When the valve system 151 is being tested hydraulically, a known current can be applied to the winding 153, and the flux sleeve 179 can then be positioned so that the valve sub-assembly 100 will read approximately a desired pressure at a given signal current (amps). In this manner, it is possible to adjust the responsiveness of the valve regulation function to the signal current, as each valve is produced. That means every valve system 150 coming off the test stand will read approximately the same pressure at the same signal current. This resolves the valve accuracy and reduces valve to valve variability at a known current. Of course, different levels of responsiveness can be set in this manner, for example, for different applications and/or to meet different fuel system specifications.

The use of the pre-load spring 127 and adjustment plug 129 allows calibration of the pre-load forces. In practice, the spool 105 will be held in a position within the valve sleeve 103. Specifically, a force probe will hold the spool 105 in that location, and the adjustment plug 129 will then be threaded in, increasing the pre-load of the spring 127 until a set load is established. At that time the plug 129 will then be locked in position (for example by application of a glue or weld) and the assembly 100 installed into the outer valve housing 171. This adjustment of the pre-load force adjusts the degree/percentage of valve opening, and thus the amount of fluid flow through the valve, when the valve system is in its zero-current state.

FIG. 3 also shows the inlet and outlet openings through the valve housing 171, as would provide the coupling to the input and output lines of the liquid (e.g. fuel) supply system. As shown, the distal end of the outer valve housing 171 forms an open end 181, and a bore 183 forms a passage from the opening 181 to an internal annular ring encircling the outer openings of the fuel in-let ports 121 of the sleeve 103. As such, fuel from a feed line flows in through the opening 181 and the passage 183 to the annular ring, and from the ring into the inlet ports 121. As discussed above, from the ports 121, the fuel flows through the valve assembly when open; and the fuel exists through the lateral bores 119 and the orifices 117. The valve housing 171 has passages 187 in alignment with the orifices 117, to allow the regulated output flow of fuel to pass through a line or other coupling to the next element of the fuel supply system.

In the first example, the provision of inlet ports 121 through the sides of sleeve 103, near the proximal end of the spool 105 tends to provide a second metering or regulation of the fuel flow, in this case as input through the ports 121 to the bores 109 and 115, in addition to the regulation of output through the orifices 117. This second regulation on the input side is unnecessary and can be eliminated by using alternate designs of the poppet portion of the spool and poppet type valve.

Figure 4:
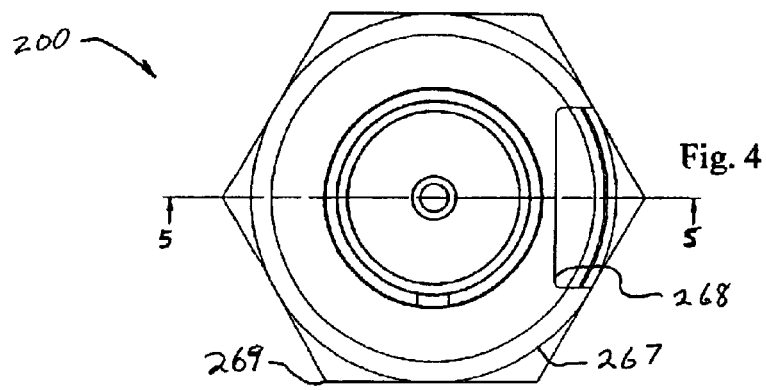
FIG. 4 is an end view of a second example of the spool-poppet type metering valve system.
Figure 5:
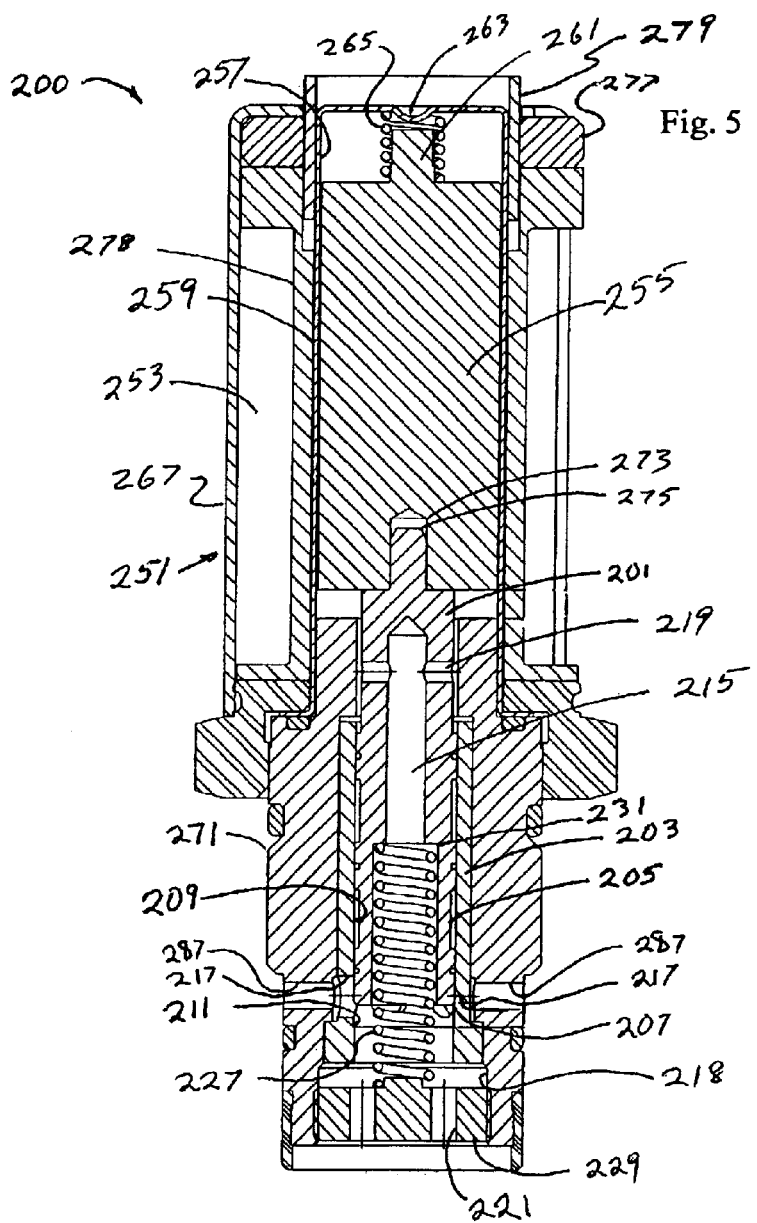
FIG. 5 is a cross-sectional view of the valve system of FIG. 4

FIG. 4 is a top view (toward the solenoid) of an example 200 of such an alternate design the spool and poppet type valve system; and FIG. 5 is a cross-sectional view of the valve system 200 (taken along line 5—5 of FIG. 4). As will be discussed, FIGS. 6–12 are detailed drawings of the sleeve and moveable valve member of this second example 200 of a spool and poppet based valve system.

As shown in FIG. 5, the valve system 200 comprises a sliding valve member 201 and a valve body or sleeve 203. The sliding moveable valve member 201 comprises a cylindrical spool 205 with an angled poppet face 207 at its distal end. As shown, the sleeve 203 includes a main central bore 209, within which the spool 205 is located for sliding axial movement. The distal end of the main central bore 209 terminates in a circular, inwardly extending shoulder, which forms the poppet valve seat 211.

Figure 6:
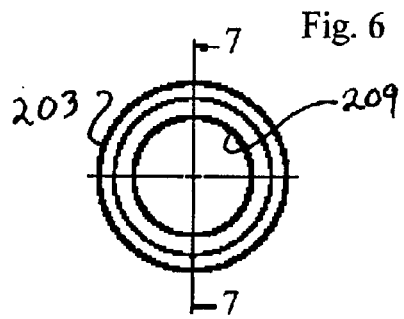
FIG. 6 is an end view of the sleeve, used in the exemplary valve system of FIGS. 4 and 5.
Figure 7:
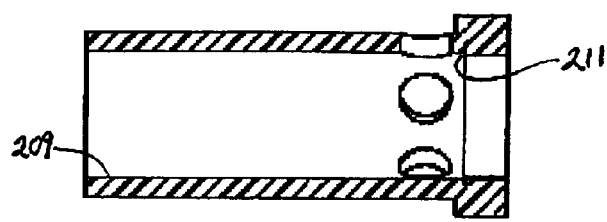
FIG. 7 is a cross-sectional view of the sleeve taken along line 7—7 of FIG. 6.

FIG. 6 is an end view of the valve sleeve 203 showing the central, axial bore 209. FIG. 7 is a cross-sectional view of the valve sleeve 203 (taken along line 7—7 of FIG. 6), showing the shoulder forming the valve seat 211, extending inward a distance from the distal end of the bore 209. In the example, the bore 209 has an inner diameter of 10.008 mm to receive the spool and is stepped down to an inner diameter of 9.720 mm to form the seat 211 at the step-down. The shoulder formed at the transition between the inner diameters forming the seat 211 is formed 3.370 mm (±0.010 mm tolerance) from the distal end of the sleeve 203. In the second example, the shoulder is formed essentially as a 0.1 mm radius curve inward from the bore 209, to form the narrower portion along the wall of the bore. Hence, the seat 211 exhibits a curvature, rather than the sharp edge as in the earlier example. Those skilled in the art will recognize that other poppet seat designs may be used.

Figure 8:
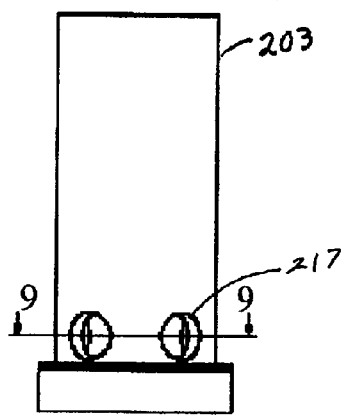
FIG. 8 is a side view of the sleeve, used in the exemplary valve system of FIGS. 4 and 5.
Figure 9:
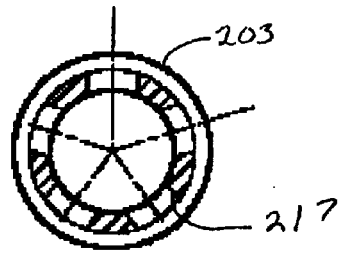
FIG. 9 is a cross-sectional view of the sleeve taken along line 9–9 of FIG. 8.

FIG. 8 is an upright side view of the sleeve 203; and FIG. 9 is a cross-sectional view taken along line 9—9 of FIG. 8. These views are useful in explaining the inlet ports through the sleeve, as will be discussed later.

Figures 10, 11:
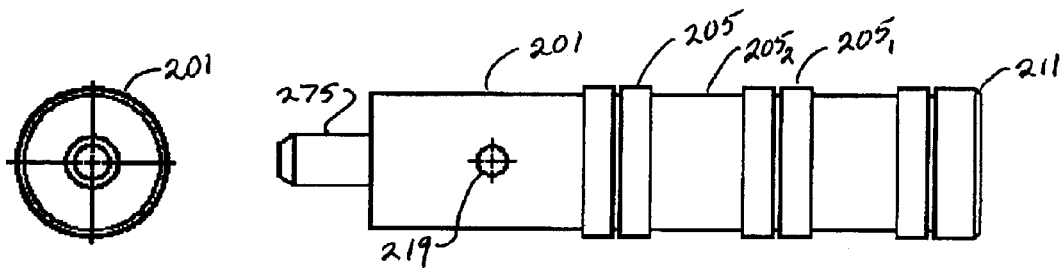
FIG. 10 is an end view of the moveable valve member, including the spool, as used in the exemplary valve system of FIGS. 4 and 5.
FIG. 11 is a side view of the moveable valve member, showing the spool and poppet face, used in the exemplary valve system of FIGS. 4 and 5.
Figure 12:
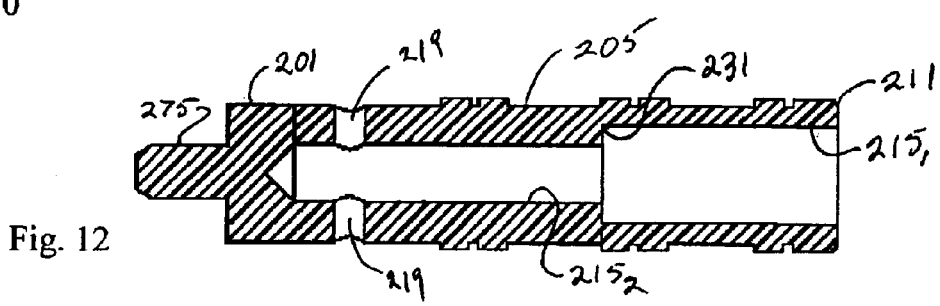
FIG. 12 is a cross-sectional view of the moveable valve member of FIGS. 10 and 11.

FIGS. 10–12 are detailed views of the moveable valve member 201. FIG. 10 is an end view, looking toward the proximal end of the moveable valve member 201. FIG. 11 is a side view of the moveable valve member 201; whereas FIG. 12 is a longitudinal cross section of the moveable valve member 201. The outermost portions of the spool 205, formed by the raised annular ring sections $205_1$, have an outer diameter of 10.0 mm (±0.003 mm tolerance). The inner portions $205_2$ of the spool 205, formed between the raised annular ring sections $205_1$, have an outer diameter of 9.0 mm. As shown in FIGS. 11 and 12, the outer edge of the spool 205 at its distal end is chamfered to form the poppet valve face 211 at a 45° angle. Viewed relative to each other, opposite sides of the valve face 211 form a 90° angle (±0.50) with respect to each other.

The spool rides in the 10.008 inner diameter portion of the sleeve bore 209. However, the outer diameter of the spool 205 (at rings $205_1$) is larger (10.0 mm) than the stepped inner diameter (9.720 mm) at the distal end of the sleeve bore 209. As a result, in the closed or cut-off state (not shown), the distal face of the spool forming the angled poppet valve face 207 engages the valve seat 211 (see FIG. 5, FIG. 7 and FIG. 11), to cut-off fuel flow and seal the clearance between the spool and the sleeve bore, thereby preventing leakage at cut-off.

The movable member 201 and the sleeve 203 may be formed of a 12L14 type standard steel having case hardness of 88–90, although stainless steels, such as a 416 stainless hardened to Rockwell C40 may be used if it appears necessary to reduce water-induced corrosion for a particular application.

The spool 205 includes a central bore 215 and two lateral bores 219 (see FIG. 5). As shown in detail in FIG. 12, this central bore actually comprises two different diameter bores $215_1$ and $215_2$. The distal portion of the spool 205 has a first inner bore 215, extending 15.5 mm into the spool and having an inner diameter of 6.35 mm. A second narrower bore $215_2$ extends to a point 35.9 mm into the spool from the distal end thereof; and this additional smaller bore $215_2$ has an inner diameter of 3.75 mm. The transition between the bores $215_1$ and $215_2$ forms a shoulder or abutment 231 for engaging the spring 227, as will be discussed, later. The bore 215 and the passages 219 allow some fuel to flow into the structure and thus into the spaces around the proximal portion of the movable member 201 and the armature 255, for example, to reduce friction. However, in this example of the valve, ports or orifices through the spool are not used to allow fuel flow through the exit orifices 217 through the sleeve 203. This example, instead relies on position of the distal end of the spool 205 relative to the exit orifices 217, to provide the regulated outlet flow of fuel from the valve system 200 (see e.g. FIG. 5).

In this example, fuel enters the valve from the distal end of the valve system 200 from a supply line or the like. The valve system 200 includes an outer valve housing 271, within which the valve sleeve 203 is mounted. The axial bore 218 of the outer valve housing 271 is capped or plugged in a threaded distal portion thereof, by the adjustment plug 229. In this example, the adjustment plug 229 includes four inlet ports 221 located at equal angles about the axis of the plug, two of which are visible in the cross-sectional view of FIG. 5. For example, the plug 229 may have four 2.5 mm diameter inlet ports.

The sleeve 203 has lateral bores forming orifices 217 for allowing the regulated fuel flow to exit from the valve system 200. In this example, there are five equally spaced orifices 217 (see FIGS. 8 and 9). The orifices 217 may have a diameter of 5 mm, and the centers of the orifices 217 are located 6.37 mm from the distal end of the sleeve 209. The valve housing 271 has passages 287 in alignment with the orifices 217 (FIG. 5), to allow the regulated output flow of fuel through a line or the like to the next element of the fuel supply system.

When the distal end of the valve system (lower end in the orientation of FIG. 5), connects to an inlet line, fuel enters through ports 221 into axial bore 218 of the outer valve housing 271 and thus into the bore 209 of the sleeve 203 and the bore 215 within the spool 205. When the poppet face 207 engages the seat 211, the poppet seal between the engaged poppet fact 207 and poppet valve seat 211 prevents outlet flow of fuel. However, when the poppet valve is open (FIG. 5), the distal end of the spool 205 (including the seat 207 on the end face) retracts past outlet portions on all of the orifices 217 of the inner valve assembly. This allows outlet flow through the passages 287 and into the line going downstream through the fuel system. The percentage of opening of the orifices 217, by retracting the spool 205 past part or all of the inner edges of the orifices 217, determines the rate of fuel allowed to exit the valve system 200 at any given instant.

Like the earlier embodiment, the system 200 includes a pre-load adjustment mechanism. As shown in FIG. 5, the spring 227 has pushed the spool 205 through the sleeve 203 to a substantially open position. The spring 227 extends from an abutment against the interior face of the adjustment plug 229 to engage a shoulder 231 formed within the central bore 215 of the spool 205. In this example, the abutment 231 is formed by the shoulder between the two different diameter bores $215_1$ and $215_2$ within the spool 205 (see also FIG. 12).

The spring 227 is a compression spring. At least a portion of the outer valve housing bore 218 is a threaded bore, and the plug 229 is threaded so that it can be screwed into that part of the bore 218. The number of turns on the plug 229 into the threaded part of bore 218 causes the plug 229 to move a predetermined distance into the threaded part of bore 218 and thereby compress the spring 227 by a precise amount. Precise adjustment of the plug position serves to define a pre-load force applied by the spring 227 against the shoulder 231 within the spool 205. The force tends to push the spool 205 into and through the sleeve 203 and thereby open the poppet portion of the valve. The spring force tends to resist closing of the poppet valve portion as well as closing of the spool valve portion, in opposition to the force of spring 265. When there is no current applied to the armature 255, the spring forces balance and thereby establish a pre-load position for the spool 205.

FIG. 5 also shows the elements for actuating the valve. As shown, the actuator includes a solenoid 251 having a winding 253 and an armature 255. The armature 255 moves within the central bore 257 of the solenoid 250 formed by the inner housing or tube 259. Movement of the armature 255 within the bore 257 allows axial movement of the armature within the solenoid winding 253. The force applied to the armature 255 is proportional to an electrical signal applied to the winding 253.

The proximal end of the armature 255 includes a central, cylindrical extension 261, and the opposing face of the inner housing 259 has a protruding dimple 263 of similar diameter extending inward toward the armature 255. A compression spring 265, of slightly larger diameter, fits over the extension 261 and the dimple 263 and extends between the inner face of the inner housing 259 and the proximal end-face of the armature 255. The compression spring 265 exerts a force on the armature 255 tending to move the armature 255, the pushpin 273 and the spool 205 toward the closed position, in opposition to the force applied by the spring 227.

An outer housing 267 encases the armature 253. As shown in FIG. 4, the outer casing 267 may have a notch 268. The housing 267 is secured to a collar 269. In this example, the collar 269 takes the form of a hexagonally shaped cap (see FIG. 4). The collar 269, in turn is attached to the outer valve housing 271. The outer valve housing 271 supports the valve sleeve 203 and through it the other elements of the valve sub-assembly, that is to say in the arrangement shown in FIG. 5.

This example eliminates the use of the pushpin (see 173 in FIG. 3). Instead, this example uses a direct coupling between the armature 255 and the moveable member 201. The proximal end of the moveable valve member 201 (and thus spool 205) connects to the armature 255 in a different manner in this example.

In the example, a bore 273 in the armature face receives a pin 275 extending from the proximal end of the spool 205, to couple the armature 255 to the moveable valve member 201. Abutment of the distal face of the armature 255 to the proximal face of the moveable valve member 201 transfers forces between the armature and moveable valve member 201. The pin 275 and bore 273 could have mating threads or other means to couple the components together. In an embodiment, the pin 275 and bore 273 are press-fit together. Those skilled in the art will recognize that other direct coupling arrangements may be utilized, for example, where a pin extends from the armature 255 and mates with a corresponding bore in the proximal face of the moveable valve member 201.

The use of the pin-and-bore arrangement as a direct form of coupling between the moveable valve member 201 and the armature 255 causes the spool 205 to effectively stabilize and guide movement of the armature. The spool 205 is more closely fit into the bore 215 of the sleeve 205 than is the armature 255 within the bore 257. Guidance of armature movement by the spool 205 reduces and/or prevents armature drag against the inside 257 of the tubular inner housing 259. This in turn reduces hysteresis in the operation of the valve system 200.

With the direct coupling, movement of the armature 255 in response to the electrical current flow through the winding 253 moves the spool 205, for example away from the poppet seat face 211 as shown in FIG. 5 or toward the poppet seat face 211 for closure (not separately shown). As the spool moves toward closure, depending on the amount of this movement, the spool 205 may reduce the amount of opening of the outlet orifices 217 and thus the amount the fuel outlet flow. However, this motion tends to compress the spring 227. The force of the solenoid may be sufficient to overcome the force of the spring 227 and push the spool 203 to the fully closed position, where the poppet face 207 engages the poppet seat 211 (similar to that shown in FIG. 2), and completely cuts off flow of fuel through the valve system 250.

This exemplary valve system 250 also uses a secondary airgap adjustment to improve accuracy and reduce valve to valve variation in performance. Specifically, the valve system 200 includes a flux washer 277 and a flux adjustment sleeve 279. In the example, the flux washer 277 and flux adjustment sleeve 279 are steel.

The adjustment sleeve 279 is moved into the magnetic path of the solenoid as illustrated in the drawing, that is to say into a portion of the gap between the winding 253 and the armature 255 of the solenoid 251. In the example, the sleeve 279 is inserted between the tube 259 and the core or bobbin 278 of the winding 253. The solenoid winding 253, when energized, produces magnetic flux lines in the magnetic circuit. Increasing overlap of the flux ring 279 to the armature 255, that is to say by pressing the ring 279 further in, increases the amount of magnetic flux lines through the armature 253, the flux washer 277, the flux ring 279 and the housing 257, 267. This is done by the addition of the steel in the magnetic circuit thus increasing the magnetic force of the solenoid 251 on the member 201, in response to a given amount of current through the winding 253 of the solenoid 251.

The use of the pre-load spring 227 and adjustment plug 229 allows calibration of the pre-load forces. In practice, before assembly with the actuator elements, the spool 205 will be held in a position within the valve sleeve 203. Specifically, a force probe will hold the spool 205 in that location, and the adjustment plug 229 will then be threaded in, increasing the pre-load of the spring 227 until a set load is established. At that time the plug 229 will then be locked in position (for example by application of a glue or weld) and the valve assembly will be installed into the outer valve housing 271. This adjustment of the pre-load force adjusts the degree/percentage of valve opening, and thus the amount of fluid flow through the valve, when the valve system is in its zero-current state.

After the setting of the pre-load adjustment, the valve system 200 is assembled as shown in FIG. 5 and staked to a hydraulic test manifold. When the valve system 200 is being tested hydraulically, a known current can be applied to the winding 253, and the flux sleeve 279 can then be positioned so that the valve sub-assembly 200 will read approximately a desired pressure at a given signal current (amps). In this manner, it is possible to adjust the responsiveness of the valve regulation function to the signal current, as each valve is produced. That means every valve system 200 coming off the test stand will read approximately the same pressure at the same signal current. This resolves the valve accuracy and reduces valve to valve variability at a known current.

Different settings of the two adjustments may be used to adapt the valve system 200 for use in different applications. For example, different fuel systems may have different requirements for performance of the fuel inlet metering valve.

The example of FIGS. 1–3 used a conical design for the distal face of the armature 155, and a conical indentation in the opposing surfaces of the outer valve housing 171. A solenoid using such a conical shaped armature produces relatively flat linear force changes, as the gap between the armature 155 and the housing 171 decreases. By contrast, the example of FIG. 5 uses flat-faces perpendicular to the movement axis on the opposing surfaces of the armature 255 and the outer valve housing 271.

Figure 13:
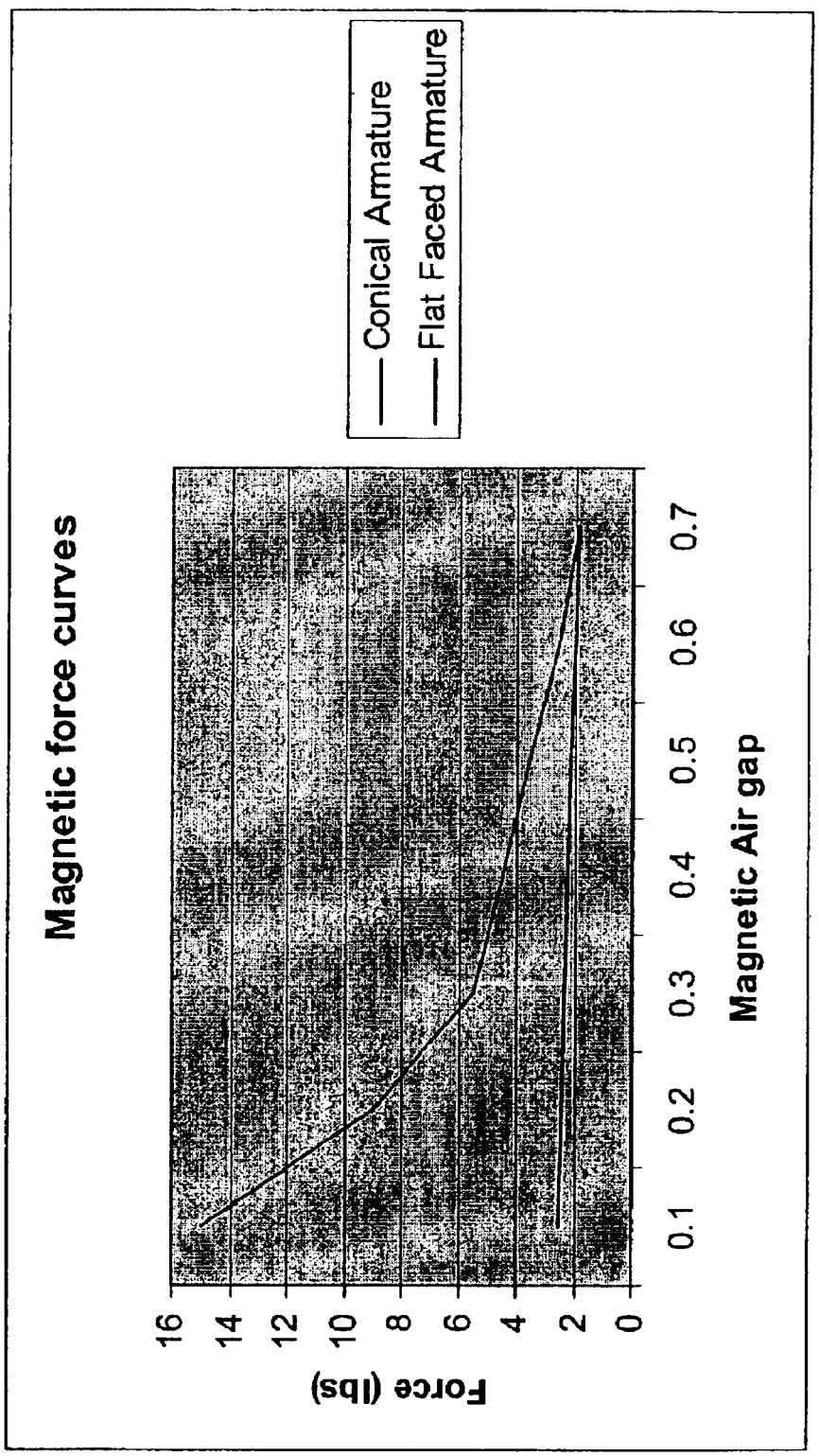
FIG. 13 is a comparative chart showing forces produced by the solenoid, depending on the gap between the armature and the valve housing, for conical and flat-faced armature designs.

FIG. 13 shows graphs of the forces produced by the solenoid depending on the gap between the armature and the valve housing, for conical and flat-faced armature designs. The lower almost linear graph is that for the conical design (e.g. for the system of FIG. 3). The upper curve shows the forces produced in a solenoid using a flat-faced configuration (e.g. the system of FIG. 5). Table 1 below lists the data depicted in the graph of FIG. 13.

TABLE 1

| | Magnetic Force | |
|---|---|---|
| Air Gap | (angled) | (flat) |
| 0.1 | 2.5 | 15.0 |
| 0.2 | 2.4 | 9.0 |
| 0.3 | 2.3 | 5.5 |
| 0.4 | 2.2 | 4.5 |
| 0.5 | 2.1 | 3.5 |
| 0.6 | 2.0 | 2.5 |
| 0.7 | 1.9 | 1.9 |

As shown in FIG. 13 and table 1, the solenoid with the flat-faced armature produces substantially increased forces as the gap narrows. In the valve system 200, this means that the magnetic forces substantially increase as the armature 255 moves the valve member 201 toward and into the position in which the poppet face 207 engages the poppet seat 211. As a result, the highest magnetic forces are applied in the position of poppet valve closure, to achieve and maintain closure of the poppet.

The discussion above and FIGS. 1–12 have focused on examples of the spool and poppet valve combination developed for a fuel inlet metering application, although those skilled in the art will recognize that the valve structures are readily adaptable to other applications. For completeness, it may be helpful to consider a specific application of the spool and poppet valve designs discussed above. At present, it is envisioned that an initial application of the valve system will be as a metering valve in the fuel system of a diesel engine.

Figure 14:
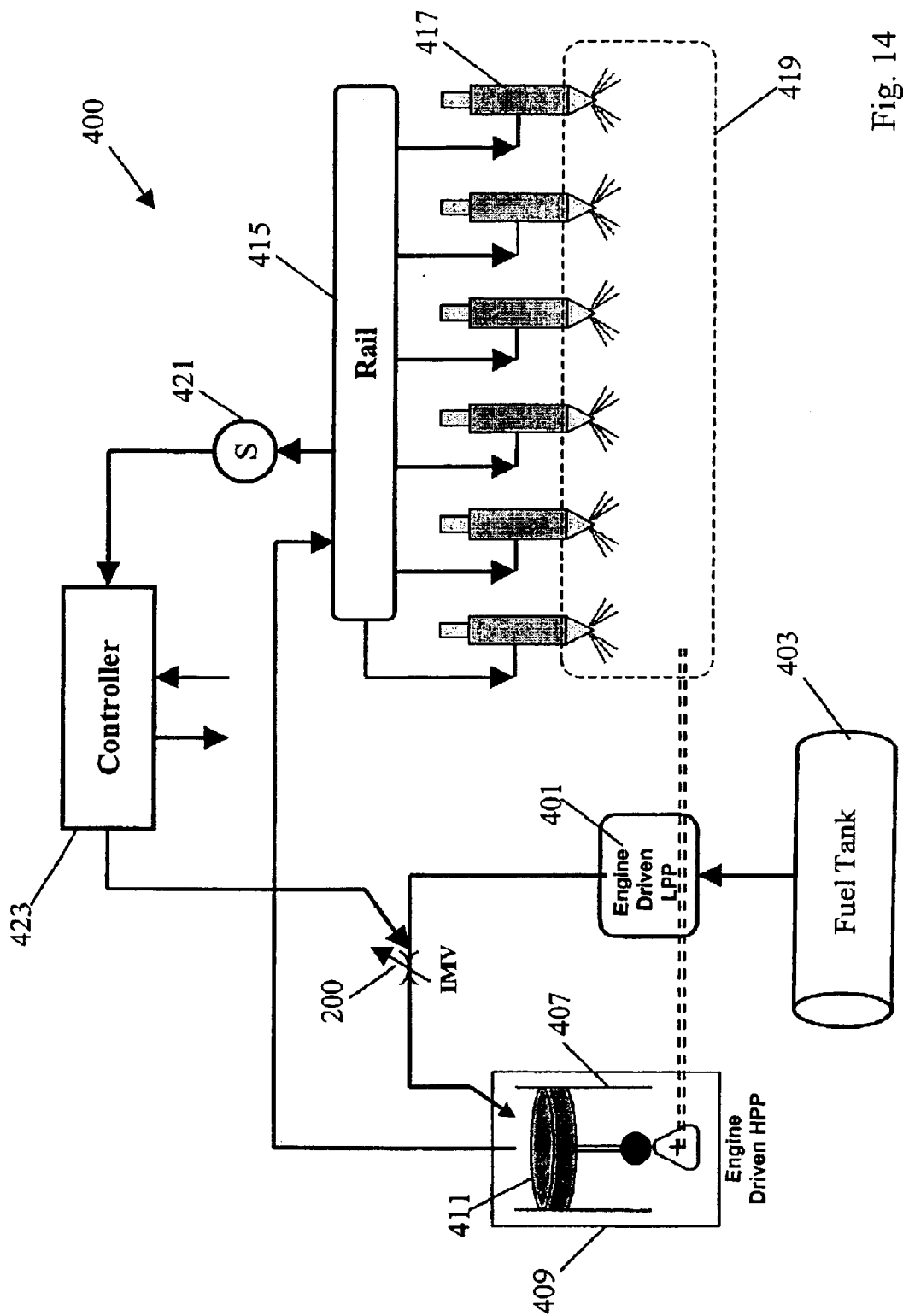
FIG. 14 is a simplified schematic of the fuel system for a diesel engine, which may utilize an exemplary valve as an inlet-metering valve (IMV).

FIG. 14 is a simplified schematic of the fuel system 400 for a diesel engine. As shown, the system includes an inlet-metering valve (IMV) of the type disclosed herein, such as the valve system 200 from the example of FIGS.

4–12. In the system 400, the engine drives a low-pressure pump (LPP) 401, typically via the camshaft. The LPP pump supplies fuel from a tank 403 through the inlet metering valve (IMV) 200 to a cylinder 407 of a high-pressure pump (HPP) 409. The pump piston 411 is driven by the engine, again, typically by the camshaft, to pump out fuel under higher pressure. In this manner, the high-pressure fuel supply flows from the pump 409 to a fuel rail 415, which in turn supplies fuel to an appropriate number of injectors 417. The injectors are controlled by a system known in the art, to inject controlled amounts of fuel into the cylinders of the diesel engine represented conceptually by the dotted line at 419, at the appropriate times to enable the desired internal combustion.

Systems for controlling the valve 200 are known, but an example is summarized here to help appreciate the control application. A sensor 421 detects fuel pressure, for example, in the rail 415 supplying fuel to the injectors 417. The sensor 421 provides a pressure signal to an electronic controller 423, typically a microprocessor-based control unit.

The controller 423 may be the main engine control unit that controls the times and durations of the opening of the injectors 417, in order to control the quantity of fuel injected by each of the injectors into each of the corresponding cylinders of the engine 419, and controls other aspects of engine operation. Of note here, the controller 423 determines the instantaneous demand for flow-rate of the fuel, from the operating parameters of the engine and the pressure detected by the sensor 421. Based on the determined demand, the controller 423 provides a control signal to the solenoid of the IMV valve 200.

The inlet-metering valve (IMV) 200 regulates the flow of fuel to the engine driven high-pressure pump (HPP) 409. As discussed above, control current to the armature of the valve 200 can regulate the flow, by adjusting the position of the spool, and can cut-off the flow of fuel by moving the poppet face into engagement with the poppet seat. The spool operation provides high flow rates with excellent flow control in response to the control current applied to the armature of the solenoid. However, the elements of the spool and sleeve need not be manufactured to particularly tight tolerances, since the poppet action completely cuts off fuel supply to the spool and sleeve portion of the valve. Hence, the valve 200 also provides low leakage at cut-off. The adjustments provided allow the valve system design to consistently meet the design specifications of the engine manufacturer for the inlet-metering valve (IMV). In fact, an embodiment of the valve disclosed herein may readily meet different specifications for different size diesel engines without structural modification.

While the foregoing has described what are considered to be the best mode and/or other examples, it is understood that various modifications may be made therein and that the invention or inventions disclosed herein may be implemented in various forms and examples, and that they may be applied in numerous applications, only some of which have been described herein. It is intended by the following claims to claim any and all modifications and variations that fall within the true scope of the inventive concepts.

What is claimed is:

1. A liquid flow metering valve system, comprising:
    an inlet opening for allowing an incoming flow of liquid;
    a valve sleeve having a central axial bore for receiving the incoming flow of liquid, a poppet valve seat, and an outlet opening extending outward from the central axial bore to the exterior of the valve sleeve;
    a moveable valve member comprising a spool configured for sliding axial movement within the central axial bore of the valve sleeve, and a poppet valve face formed in a distal end of the moveable valve member for closing off flow of liquid to the outlet opening of the valve sleeve when the moveable valve member is positioned so that the poppet valve face engages the poppet valve seat;
    wherein, when the moveable valve member is positioned so that the poppet valve face is withdrawn from engagement with the poppet valve seat so as to enable flow of liquid to the outlet opening, movement of the moveable valve member within the central axial bore of the valve sleeve changes the position of the spool relative to the outlet opening of the valve sleeve so as to regulate liquid output; and
    a solenoid comprising an armature and a winding, wherein the solenoid is coupled to a proximal end of the moveable valve member to axially move the moveable valve member within the central axial bore in response to a control current applied to the solenoid.

2. The valve system as in claim 1, wherein the inlet opening for allowing an incoming flow of liquid comprises at least one port through a sidewall of the sleeve.

3. The valve system as in claim 1, further comprising an adjustable flux member interposed between the winding and the armature, wherein adjustment of positioning of the adjustable flux member between the winding and the armature adjusts the flux coupling between the winding and the armature for setting responsiveness of the valve system to an electronic signal applied to the solenoid.

4. The valve system as in claim 1, further comprising:
    an adjustable end plug mounted across an open end of the central axial bore of the sleeve opposite the distal end of the moveable valve member, and
    a spring extending between the end plug and the distal end of the moveable valve member, for exerting a force on the moveable valve member opposing movement of the moveable valve member toward the position in which the poppet valve face engages the poppet valve seat;
    wherein the position of the end plug is set in position relative to the sleeve such that the spring provides a set pre-load force on the moveable valve member when the solenoid is not energized.

5. The valve system as in claim 4, wherein the inlet opening for allowing an incoming flow of liquid comprises at least one port through the end plug in fluidic communication with an otherwise open end of the sleeve.

6. The valve system as in claim 1, wherein the armature is moveable with the moveable valve member of the valve.

7. The valve system as in claim 6, further comprising:
    a pushpin between a distal face of the armature and a proximal face of the moveable valve member; and
    an outer valve housing attached to the sleeve, the outer valve housing having a bore coaxial with the central axial bore of the sleeve and surrounding and guiding axial movement of the pushpin.

8. The valve system as in claim 6, further comprising means for directly coupling the armature to the moveable valve member.

9. The valve system as in claim 8, wherein said means comprises a bore in a distal end of the armature and a pin extending from the proximal end of the moveable valve member into the bore in the distal end of the armature.

10. The valve system as in claim 1, wherein:
    the spool comprises a lateral bore extending outward from an interior of the spool exposed to the inlet flow of liquid, and variable overlap of the lateral bore with the valve outlet opening of the sleeve, as the spool moves, varies percentage of opening of the valve outlet opening.

11. The valve system as in claim 1, wherein movement of the distal end of the moveable valve member in relation to the valve outlet opening of the sleeve varies percentage of opening of the valve outlet opening.

12. An inlet metering valve system, for metering the flow of liquid fuel in a fuel system for a diesel engine, the inlet metering valve system comprising:

an inlet opening for coupling to a fuel supply, allowing an incoming flow of the fuel;

a valve sleeve having a central axial bore for receiving the incoming flow of fuel, and an outlet opening extending outward from the central axial bore;

a valve seat at a fixed axial location relative to the central axial bore of the sleeve;

a moveable valve member comprising a spool configured for sliding axial movement within the central axial bore of the valve sleeve, and a poppet valve face formed in a distal end of the moveable valve member for closing off flow of the fuel to the outlet opening of the valve sleeve when the moveable valve member is positioned so that the poppet valve face engages the poppet valve seat;

wherein movement of the moveable valve member within the central axial bore of the valve sleeve changes the position of the spool relative to the outlet opening of the valve sleeve so as to regulate fuel output, when the moveable valve member is positioned so that the poppet valve fa is out of engagement with the poppet valve seat;

a solenoid comprising an armature and a winding, wherein the solenoid is coupled to a proximal end of the moveable valve member to axially move the moveable valve member in response to a control current applied to the solenoid;

flux adjustment means, for adjustably setting flow of magnetic flux during operation of the solenoid; and a pre-load adjustment means, for adjustably setting a loading force applied to the moveable valve member when the solenoid is not energized.

13. The valve system as in claim 12, wherein the flux adjustment means comprises an adjustable flux member interposed between the winding and the armature, wherein adjustment of positioning of the adjustable flux member between the winding and the armature sets the flux coupling between the winding and the armature so as to set responsiveness of the valve system to an electronic signal applied to the solenoid.

14. The valve system as in claim 12, wherein the payload adjustment means comprises:

an end plug opposite an open end of the sleeve; and a spring extending between the end plug and the distal end of the moveable valve member, for exerting a force on the moveable valve member opposing movement of the moveable valve member toward the position in which the poppet valve face engages the poppet valve seat;

wherein the position of the end plug is set in position relative to the sleeve such that the spring provides a set pre-load force on the moveable valve member when the solenoid is not energized.

15. The valve system as in claim 12, wherein:

the winding comprises a stator winding;

the armature is mounted for axial movement within the stator winding; and a distal end of the armature is coupled to the proximal end of the moveable valve member.

16. The valve system as in claim 15, wherein the distal end of the armature is conical.

17. The valve system as in claim 15, wherein:

the distal end of the armature comprises an end face opposite the proximal end of the moveable valve member; and the end face of the armature comprise a flat portion perpendicular to an axis of movement of the armature.

18. A liquid flow metering valve system, comprising:

an inlet opening for allowing an incoming flow of liquid;

a valve sleeve having a central axial bore for receiving the incoming flow of liquid, a poppet valve seat, and an outlet opening extending outward from the central axial bore to the exterior of the valve sleeve;

a moveable valve member comprising a spool configured for sliding axial movement within the central axial bore of the valve sleeve, and a poppet valve face formed in a distal end of the moveable valve member, the poppet valve face engaging the poppet valve seat to close off flow of liquid to the outlet opening of the valve sleeve; the spool having a lateral bore extending outward from an interior of the spool;

wherein, when the moveable valve member is positioned so that the poppet valve face is withdrawn from engagement with the poppet valve seat, the lateral bore is aligned with the outlet opening so as to enable flow of liquid to the outlet opening, movement of the moveable valve member within the central axial bore of the valve sleeve changes the position of the spool relative to the outlet opening of the valve sleeve so as to regulate liquid output; and a solenoid comprising an armature and a winding, wherein the solenoid is coupled to a proximal end of the moveable valve member to axially move the moveable valve member within the central axial bore in response to a control current applied to the solenoid.

19. The valve system of claim 1, wherein the spool has a lateral bore extending outward from an interior of the spool, wherein the lateral bore is configured such that it overlaps at least a portion of the outlet opening when the moveable valve member is positioned such that the poppet valve face is withdrawn from engagement with the poppet valve seat.

20. The valve system of claim 1, wherein the moveable valve member has a central bore for receiving the incoming flow of a liquid, and a lateral bore extending outward from the central bore; wherein the central bore and lateral bore are configured such that when the moveable valve member is moved away from the poppet valve seat, liquid flows into the central axial bore of the valve sleeve, through the central bore and lateral bore of the moveable valve member, and out the outlet opening in the valve sleeve.

* * * * *